United States Patent [19]

Cornish et al.

[11] 4,350,397
[45] Sep. 21, 1982

[54] LOW STRENGTH MATERIAL HOUSING BEARING

[75] Inventors: Paul M. Cornish, Plainville; Charles E. Condon, Jr., Harwinton, both of Conn.

[73] Assignee: The Torrington Company, Torrington, Conn.

[21] Appl. No.: 199,942

[22] Filed: Oct. 23, 1980

[51] Int. Cl.³ .............................................. F16C 33/58
[52] U.S. Cl. .................................. 308/212; 308/213; 308/216
[58] Field of Search ............... 308/212, 216, 202, 213, 308/214, 193, 195

[56] References Cited

U.S. PATENT DOCUMENTS

| 2,488,848 | 11/1949 | Carullo et al. | 308/212 |
| 2,606,798 | 8/1952 | Hickling | 308/213 |
| 2,659,637 | 11/1953 | Barr | 308/216 |

Primary Examiner—Lenard A. Footland
Attorney, Agent, or Firm—Frank S. Troidl

[57] ABSTRACT

The bearing is particularly adapted for use in the bore of a low strength material housing. The bearing includes a race with a plurality of rollers contained in the race. The length of the race is greater than the race-roller contact length. The race includes an annular, radially extending portion spaced lengthwise from one end of the rollers and a reduced, outside diameter extending lengthwise from the annular portion to a point closer to the annular portion than the closest race-roller contact point.

4 Claims, 1 Drawing Figure

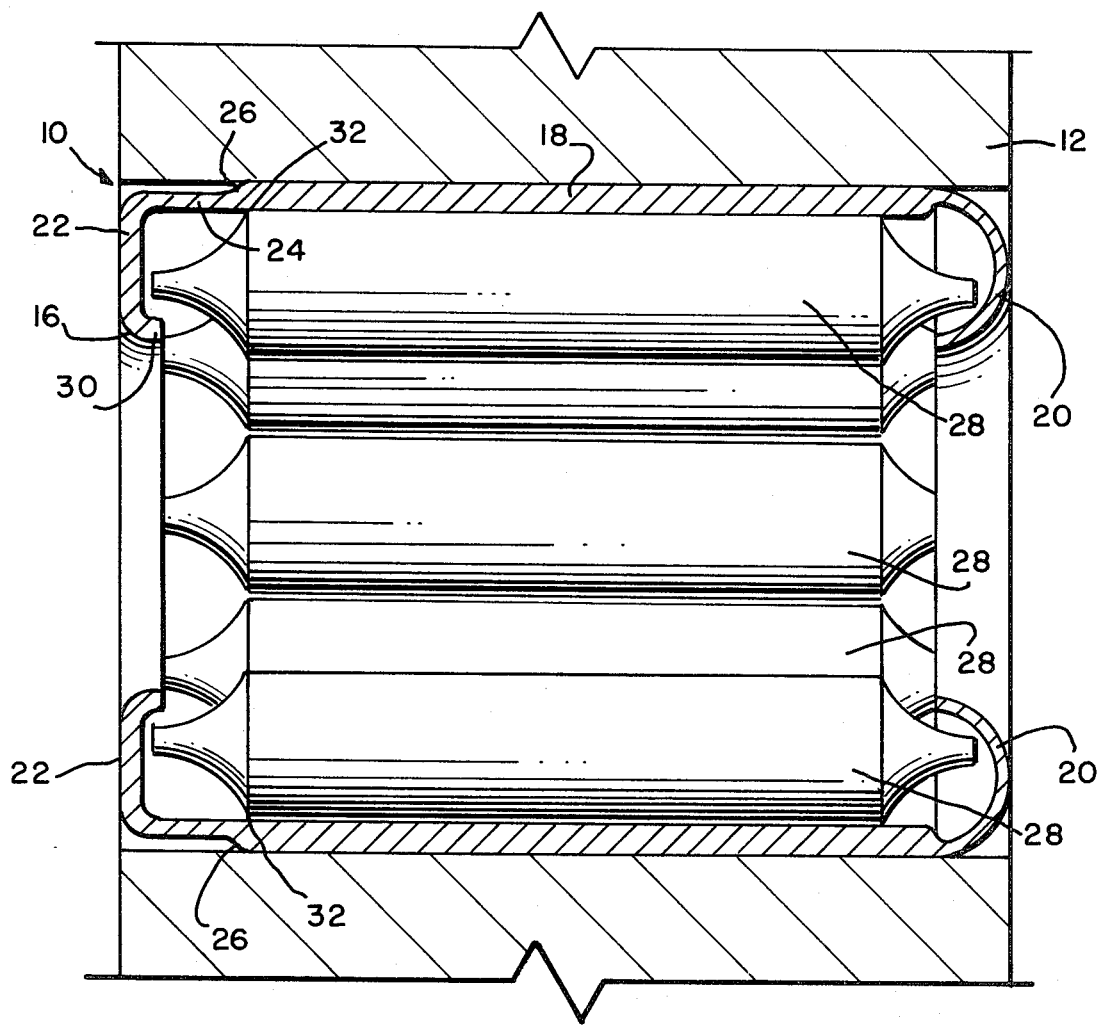

LOW STRENGTH MATERIAL HOUSING BEARING

This invention relates to bearings. More particularly, this invention is a new bearing which is particularly adapted for use in a bore of a low strength material housing such as low strength aluminum or die cast housings.

For certain uses bearings such as drawn cup bearings are press-fitted into housings in order to position the bearings as well as insure roundness and proper bore size of the assembled bearing. The typical drawn cup bearing has one end which is referred to as the curled end with the other end including an annular portion extending radially from the bore of the bearing to the race. If the bearing is to be assembled into the bore of a high strength steel housing, there is no problem because the bearing may be assembled into the housing by the insertion of either end of the bearing into the housing. However, when the housing is made of low strength aluminum or die cast, the bearing must be assembled into the bore curled end first. The reason being that if the bearing is assembled into a low strength housing, with the non-curled end first the thicker metal and strength configuration of the non-curled end will size the bore of the low strength housing rather than the housing completely sizing the bearing.

It is not unusual for the assembler to mistakenly insert the wrong end of the bearing into the low strength material housing. This, of course, damages both the bearing and the bore of the housing.

This invention is a new bearing particularly adapted for use in the bore of a low strength material housing which may be inserted either end first without damaging the bearing or the bore surface.

Briefly described, the bearing includes a race with a plurality of rollers. The length of the inside of the race is greater than the race-roller contact length. The race includes an annular, radially extending end portion spaced lengthwise from one end of the rollers. A reduced outside diameter portion extends lengthwise from the annular portion to a point closer to said annular portion than the closest race-roller contact point.

The invention as well as its many advantages may be further understood by reference to the single figure which is an elevational view, partly in section, showing a preferred embodiment of the invention.

Referring to the FIGURE, the new bearing is inserted into the bore 10 of a low strength material housing 12.

The bearing includes a race 18 which preferably is of the drawn cup type. Race 18 has substantially the same inside diameter throughout its length and has a curled end 20. The curled end is thinner than the longitudinally extending portion of the race to which the curled end is connected. This provides some flexibility to the curled end so that the curled end may be inserted into the bore without damaging the bearing or the bore wall. The other end of the race includes an annular, radially extending end portion 22. End portion 22 is thicker and has a stronger configuration than the curled end 20.

In accordance with the invention, the race 18 is provided with a reduced outside diameter portion 24 extending lengthwise from the annular portion 22 toward the curled end 20. Thus, the thickness of the race along the length of the reduced diameter portion is less than the thickness along the length of the rest of the race 18 and less than the thickness of annular portion 22. This provides enough flexibility to permit the insertion of this end of the bearing into the bore 10. Thus, either end of the bearing may be inserted into the bore of a low strength material housing without fear of causing any damage.

The reduced diameter portion 24 is connected to the rest of the race by an annular shoulder 26. The annular shoulder is formed to avoid an abrupt step between two different outside diameters to reduce the chance of scoring the housing bore at installation.

A plurality of trunnion rollers 28 are located within the race 18 and kept in place by the axially extending annular flange 30 on radially extending portion 22 and the curved inside of the curled end 20.

It is very important that the reduced diameter portion 24 of the race 28 not have any portion which is subject to the loaded portion of the race. The reduced diameter portion 24 should not have any part of it adjacent a race-roller contact point. Thus, the length of the inside of the race 18 is made greater than the race-roller contact length. The radially extending annular member 22 is spaced lengthwise from the extreme end of the trunnion rollers 28 and the reduced outside diameter portion 24 extends lengthwise from the annular portion 22 to a point closer to the annular portion 22 than the closest race-roller contact point 32. Thus, no portion of the reduced diameter portion 24 is adjacent a race-roller contact point, and despite the reduced diameter portion with its resulting reduced thickness, our new bearing has full load capacity.

Though a drawn cup bearing with trunnion rollers is specifically described herein as a preferred embodiment, it is to be understood that other type rollers, such as cylinder rollers, with or without cages, may be used. Also, the invention is equally applicable to clutches using rollers as well as bearings.

We claim:

1. A bearing for use in a bore of a low strength material housing comprising: a race, a plurality of rollers contained in said race, the length of the inside of the race being greater than the race-roller contact length, said race including an annular, radially extending portion spaced lengthwise from the nearest race-roller contact point and a reduced outside diameter portion extending lengthwise from said annular portion to a point closer to said annular portion than said nearest race-roller contact point, the outside surface of the reduced diameter portion being parallel to the outside surface of the race along the race-roller contace length and the thickness of the race along the length of the reduced diameter portion being less than the thickness of the race along the race-roller contact length.

2. A bearing in accordace with claim 1 wherein an annular shoulder interconnects the reduced diameter portion and the rest of the race, said annular shoulder being formed to avoid an abrupt step between the reduced diameter portion and the rest of the race.

3. A bearing in accordance with claim 2 wherein the other end of the race is a curled end having a thinner cross section than the longitudinally extending portion.

4. A bearing in accordance with claim 2 wherein the thickness of the race along the length of the reduced diameter portion is less than the thickness of the annular radially-extending portion.

* * * * *